United States Patent Office 3,598,817
Patented Aug. 10, 1971

3,598,817
AMINOALKYL ESTERS OF 4-BENZYLPIPERIDINE-1-CARBOXYLIC ACID
Claude L. C. Carron and Maurice C. E. Carron, Hauts-de-Seine, and Bernard Ph. Bucher, Essonne, France, assignors to Societe Anonyme des Laboratoires Robert et Carriere, Paris, France
No Drawing. Filed Dec. 2, 1968, Ser. No. 780,553
Claims priority, application France, Dec. 5, 1967, 130,945; Aug. 30, 1968, 164,686; Oct. 8, 1968, 169,105
Int. Cl. C07d 29/24
U.S. Cl. 260—247.2                                    34 Claims

ABSTRACT OF THE DISCLOSURE

The invention provides novel aminoalkyl esters of 4-benzylpiperidine-1-carboxylic acid and their salts which are useful in treating cardiac disturbances.

---

The present invention provides as new compounds, the 4-benzylpiperidine-1-carboxylic acid esters of the formula:

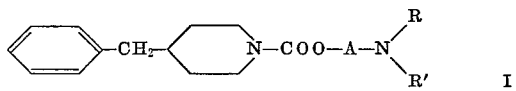    I in which A represents a straight or branched alkylene chain, preferably of 2 to 8 carbon atoms, and R and R' are the same or different and represent hydrogen or an alkyl or aralkyl radical, preferably alkyl of 1 to 4 carbon atoms or phenylalkyl in which the alkyl residue is of 1 to 4 carbon atoms, or together with the adjacent nitrogen make up a heterocyclic radical such as pyrrolidino, piperidino or morpholino, and the salts of these basic esters with pharmaceutically acceptable acids, such as hydrochloric, ascorbic, maleic or succinic acid, and especially hydroxy-acids such as tartaric, citric, lactic or hydroxymaleic acid.

According to the invention, the compounds of Formula I and their pharmaceutically acceptable acid addition salts are prepared by reacting an amino-alcohol of formula:

    II in which A, R and R' are as hereinbefore defined, with a halide or an alkyl ester of 4-benzylpiperidine-1-carboxylic acid, and optionally converting a base so obtained into a pharmaceutically acceptable acid addition salt. The reaction preferably takes place in the presence of a basic condensation agent.

According to a further feature of the invention, the compounds of Formula I and their pharmaceutically acceptable acid addition salts are prepared by reacting 4-benzylpiperidine with a halogenoformate of the formula:

X—COO—A—Z in which X is a halogen atom, Z is a halogen atom or a radical of formula

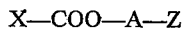

and A, R and R' are as hereinbefore defined, followed, where Z is halogen, by reaction of the product with an amine of formula HNRR', and optionally converting a base so obtained into a pharmaceutically acceptable acid addition salt thereof.

These methods of preparation are shown schematically below:

First process
Method A:

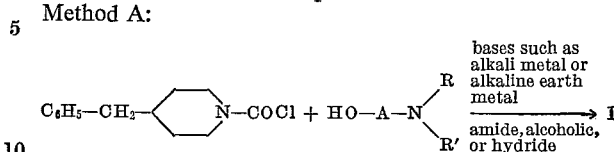

Method B:

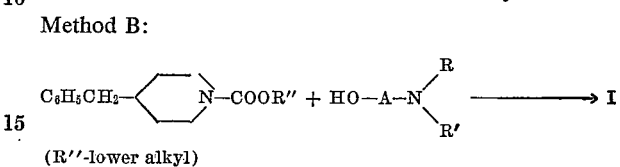

(R''-lower alkyl)

Second process
Method C:

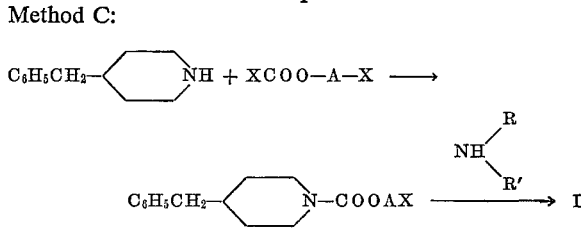

(X-halogen)

Method D:

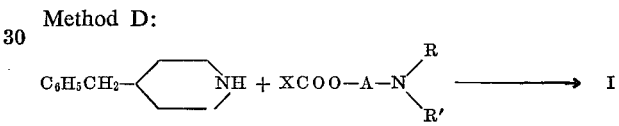

The detailed operation of methods A, B, and C is described in the examples below.

The salts of the compounds of Formula I are obtained by separately dissolving the basic ester and the desired acid in an alcohol and mixing the two solutions. The salts generally precipitate at least partially. It is possible to separate them by adding diethyl ether and/or by evaporating the solution. For example, to obtain the citrate of the β-diethylaminoethyl ester of 4-benzylpiperidine-1-carboxylic acid, the basic ester and the citric acid are separately dissolved in an alcohol, in particular isopropanol, and the two solutions are then mixed. The salt precipitates partially. It may be separated by adding diethyl ether. After standing, the crystalline compound is filtered off, washed with diethyl ether, and dried.

The following non-limiting examples illustrate the invention. Temperatures are in degrees centigrade.

EXAMPLE 1

β-Diethylaminoethyl 4-benzylpiperidine-1-carboxylate and its citrate (a) The acid chloride of benzylpiperidine-1-carboxylic acid is prepared in the following manner. 50 g. of 4-benzylpiperidine (0.28 mol) are added dropwise to a 20% strength solution of 72 g. (0.14 mol) of phosgene in toluene, at a temperature of about 0°. After completion of the addition, the mixture is allowed to return to ordinary temperature and the precipitated benzylpiperidine hydrochloride is filtered off. The filtrate is evaporated to dryness. 31 g. (93% yield) of the acid chloride are obtained and are used without purification for conversion to the ester.

(b) 3.45 g. of sodium are added to 17.8 g. of β-diethylaminoethanol (0.15 mol) in 200 ml. of anhydrous toluene, and the mixture is heated under reflux until all the sodium has dissolved. 31 g. (0.13 mol) of the acid chloride previously obtained, dissolved in 100 ml. of toluene, are then added dropwise. Reflux is continued for 2 hours. The reaction mixture is taken up in water, and the toluene layer is separated and dried. The resulting residue is distilled under reduced pressure after the solvent has been evaporated. 27 g. of an oil of a pale yellow colour (66% yield), boiling at about 170–175° under a pressure of 0.1 mm. of mercury, are thus obtained. Amine determination: calculated molecular weight, 317; equivalent found, 317.2.

(c) Reaction of citric acid with the amine in equimolecular proportion yields a monocitrate which crystallises well and which is purified by reprecipitation in a mixture of alcohol and diethyl ether. The citrate melts at about 110° (decomposition). Its solubility in water is more than 15% and the saturated solution has a pH of about 5.

EXAMPLE 2

1-N,N-diethylaminoprop-2-yl 4-benzylpiperidinecarboxylate and its citrate (a) Ethyl 4-benzylpiperidine-1-carboxylate is prepared as follows. 16.3 g. of ethyl chloroformate (0.15 mol) are added dropwise to a well-dried 3-necked flask containing 26.1 g. of 4-benzylpiperidine (0.15 mol), 100 ml. of pyridine and 100 ml. of benzene, with cooling in a bath of ice and salt. The mixture is stirred for 1 hour at ambient temperature and then for 2 hours with heating under reflux. The resulting precipitate is filtered off and the filtrate is evaporated to dryness to drive off the excess pyridine. The residue is taken up in diethyl ether and the ethereal extract is washed with water and then with dilute hydrochloric acid. After neutralisation with sodium bicarbonate and drying, the ethereal extract is fractionated. 30 g. of the desired ester, representing a yield of 81%, are obtained (boiling point: 140°/0.03 mm. Hg). Determination of nitrogen: N percent calculated, 5.66; N percent found, 5.73.

(b) 12.3 g. of ethyl 4-benzylpiperidine-1-carboxylate (0.05 mol) and 20 g. of 1-N,N-diethylaminopropanol-2 (0.15 mol) are mixed in a distillation flask. The mixture is heated to about 150° and 0.3 g. of sodium is added in small pieces. The mixture is heated for 30 minutes at 150° and the temperature progressively raised to drive off the ethanol formed and the excess aminoalcohol. After cooling, the mixture is taken up in dilute hydrochloric acid and extracted with diethyl ether. The aqueous layer is rendered alkaline and then extracted again with diethyl ether. The ethereal solutions are combined, repeatedly washed with water, dried, and fractionated. 8 g. of product, a yield of 50%, are obtained, B.P. 185°/0.07 mm. Hg or 170°/0.05 mm. Hg.

*Analysis.*—Amine determination, molecular weight calculated, 332; molecular weight found, 333.

The aminoalcohol is converted into its citrate, which is hygroscopic and very soluble in water, by the standard procedure.

EXAMPLE 3

β-diisopropylaminoethyl 4-benzylpiperidine-1-carboxylate and its hydrochloride (a) 1.6 g. of sodium (0.07 g. atom) are heated under reflux with a solution of 24 g. (0.165 mol) of β-diisopropylaminoethanol in 150 ml. of toluene until completely dissolved. The mixture is cooled to +20° and a solution of 15 g. (0.063 mol) of 4-benzylpiperidine-1-carboxylic acid chloride in 100 ml. of toluene is added all at once. The mixture is boiled for 8 hours. After cooling, 200 ml. of water are added. The organic layer is extracted with dilute hydrochloric acid. The aqueous phase is rendered alkaline and then extracted with diethyl ether. The extract is dried and fractionated. 13.7 g. of the desired basic ester, a yield of 62%, are obtained, B.P. 178°/0.01 mm. Hg. Analysis: (amine determination) molecular weight calculated, 347; molecular weight found, 343.

(b) The amine is converted into the hydrochloride with hydrogen chloride in ethanol solution. The hydrochloride melts at 115°. Analysis: inorganic Cl, percent calculated, 9.47; found, 9.47. The solubility of this salt in water is over 20%.

Other compounds corresponding to general Formula I were prepared in an entirely similar manner and in accordance with the techniques described in Examples 2 and 3. The only differences are in the heating time, which is longer or shorter depending on the reactivity of the starting materials. Sodium may be replaced as the condensation agent by another alkali metal such as potassium or by an alkaline earth metal such as magnesium. Other inert solvents, such as benzene or xylene, may be used.

The yields are good (50–75%) and the analytical results satisfactory in the case of all the derivatives. Table I gives a first list of products obtained (including those of Examples 1, 2 and 3) with their characteristics.

Before this, the preparation of another intermediate, namely methyl 4-benzylpiperidine-1-carboxylate, will be described. 18 g. of 4-benzylpiperidine-1-carboxylic acid chloride (0.076 mol) are added a little at a time to a solution of 1.8 g. of sodium (0.078 g. atom) in 150 ml. of methanol. The mixture is kept at about 60° for 2 hours, filtered, taken up in water and then extracted with diethyl ether. The ethereal extract is dried and then distilled. 13.8 g. of the desired ester, a yield of 77% (B.P. 140–1°/0.05 mm. Hg) are obtained.

The various other lower alkyl 4-benzylpiperidine-1-carboxylates may also be prepared as described above and in (a) of Example 2.

TABLE I

| Example No. | A | R | R' | $-N\begin{smallmatrix}R\\R'\end{smallmatrix}$ | Boiling point of the amine | Melting point of the hydrochloride, degrees [1] |
|---|---|---|---|---|---|---|
| 1 | $-CH_2CH_2-$ | $C_2H_5$ | $C_2H_5$ | | 170–175°/0.1 mm | |
| 2 | $-CH-CH_2-$<br>   $\|$<br>   $CH_3$ | Same | Same as above | | 170°/0.05 mm. Hg | |
| 3 | $-CH_2-CH_2-$ | $iC_3H_7$ | $iC_3H_7$ | | 178°/0.01 mm. Hg | 115 |
| 4 | $-CH-CH_2-$<br>   $\|$<br>   $CH_3$ | $CH_3$ | $CH_3$ | | 146–8°/0.001 mm. Hg | 114 |
| 5 | $-CH-CH_2-$<br>   $\|$<br>   $C_3H_7n$ | $C_2H_5$ | $C_2H_5$ | | 180°/0.05 mm. Hg | |
| 6 | $-CH_2-CH_2-$ | $n-C_4H_9$ | $n-C_4H_9$ | | 195–200°/0.05 mm. Hg | |
| 7 | Same as above | | |  | 180°/0.05 mm. Hg | [1] 140 |
| 8 | do | $CH_3$ | $CH_3$ | | 152°/0.01 mm. Hg | |

TABLE I—Continued

| Example No. | A | R | R' | -N(R)(R') | Boiling point of the amine | Melting point of the hydrochloride, degrees [1] |
|---|---|---|---|---|---|---|
| 9 | do | | | -N⟨ ⟩O (morpholino) | 210°/0.05 mm. Hg | [1] 162 |
| 10 | -C(CH₃)₂-CH₂- | C₂H₅ | C₂H₅ | | Approx: 210°/0.02 mm. Hg [1] | 129 |
| 11 | -C(CH₃)₂-CH₂-CH₂-CH₂-CH(CH₂)- | H | H | | 220–30°/0.001 mm. Hg | |
| 12 | -CH₂-CH₂- | CH₃ | -CH₂-CH₂-C₆H₅ | | 220°/0.03 mm. Hg | |
| 13 | -CH(CH₃)-CH₂- | Same | Same as above | | 250°/0.03 mm. Hg [1] | |
| 14 | Same as above | do | i-C₃H₇ | | 170°/0.01 mm. Hg | |
| 15 | -CH₂-CH₂-CH₂- | C₂H₅ | C₂H₅ | | 190–5°/0.05 mm. Hg | 86 |

[1] Decomposition.

EXAMPLES 16 TO 28

2-(N,N-di-n-butylamino)-propyl 4-benzylpiperidino-1-carboxylate

The starting 1-chloro-2-propanol, $$Cl-CH_2-CHOH-CH_3$$

is obtained by the method of Dewael, Bull. Soc. Chim. Belges 39, 87–90 (1930). This halogeno-alcohol is converted into 1-chloroisopropyl chloroformate $$Cl-CO-O-\underset{\underset{CH_3}{|}}{CH}-CH_2Cl$$

in the following manner: 130 g. of phosgene are passed into a stirred solution of 1 mol. (95 g.) of 1-chloro-2-propanol in 350 ml. of toluene at 0°. The mixture is allowed to return to ordinary temperature while stirring is continued. After 12 hours standing the excess phosgene is removed by a stream of nitrogen and the toluene is evaporated. The residue is distilled. The fraction (52 g.) which passes over at 147–160°/760 mm. Hg is collected. This product is not purified for the next stage.

A solution of 37 g. of the above compound in 100 ml. of dry diethyl ether is then added dropwise and with gentle cooling to a solution of 0.4 mol (69.6 g.) of 4-benzylpiperidine in 100 ml. of dry diethyl ether. When the addition is complete, stirring is continued and the mixture then kept under reflux for 1 hour and allowed to stand for 12 hours. A precipitate of 4-benzylpiperidine hydrochloride forms and this is filtered off and washed with 200 m. of diethyl ether. The combined ethereal solutions are washed, first with 80 ml. of water+10 ml. of concentrated hydrochloric acid, then with 80 ml. of water, and finally with 40 ml. of water. They are then dried over anhydrous magnesium sulphate, the ether is evaporated, and the residue is distilled. 41 g. of 1-chloro-2-propyl 4-benzylpiperidine-1-carboxylate, a yield of 70%, are obtained, B.P. about 185°/0.02 mm. Hg. Analysis of Cl: theoretical, 12.02%; found, 12.0%.

The compound is finally converted into the desired product in the following manner. A mixture of 17.6 g. (0.06 mol) of 1-chloro-2-propyl 4-benzylpiperidine-1-carboxylate, 50 ml. of di-n-butylamine (0.3 mol) and about 0.5 g. of sodium iodide is kept under reflux for 12 hours in an oil bath at 160°. The whole is then taken up in 300 ml. of diethyl ether. After the dibutylamine hydrochloride has been separated, the ethereal liquid is twice extracted with dilute hydrochloric acid. The hydrochloric acid solution is rendered alkaline with 10 N sodium hydroxide solution with cooling, and the aqueous phase is subjected to four successive extractions with 80 ml. of diethyl ether each time. Finally the ethereal solution is dried, the solvent is evaporated, and the residue is fractionated. 8.5 g. of the desired product, a yield of 37%, are thus obtained, B.P. 200–210°/0.03 mm. Hg. $n_{27}{}^D=1.5045$. Amine analysis: molecular weight calculated, 387; found 382.

Table II is a list of products obtained with the method of preparation used for each of them, the yields and the characteristics of these products.

TABLE II

| Example No. | A | R | R' | Method | Yield, percent | Boiling point of the amine | Melting point of the hydrochloride, degrees |
|---|---|---|---|---|---|---|---|
| 16 | -CH(CH₃)-CH₂- | -C₄H₉n | -C₄H₉n | C | 37 | 210°/0.03 mm. Hg | |
| 17 | -CH₂-CH₂- | -C₃H₇n | -C₃H₇n | A | 65 | 178–180°/0.05 mm. Hg | |
| 18 | Same as above | -CH₃ | -CH₂C₆H₅ | A | 84.6 | 215°/0.05 mm. Hg | |
| 19 | do | -C₂H₅ | -CH₂-CH₂-C₆H₅ | A | 68 | 208°/0.03 mm. Hg | |
| 20 | do | -C₃H₇n | Same as above | A | 49 | 210°/0.03 mm. Hg | |
| 21 | do | -CH₃ | -(CH₂)₃-C₆H₅ | A | 61 | 240°/0.02 mm. Hg | |
| 22 | -CH(CH₃)-CH₂- | -C₃H₇i | -C₃H₇i | A | 40 | 180°/0.06 mm.Hg | 132 |
| 23 | Same as above | -C₃H₇n | -C₃H₇n | A | 35 | 190°/0.02 mm. Hg | 130 |
| 24 | do | -CH₃ | -CH₂-C₆H₅ | A | 52 | 225°/0.03 mm. Hg | |
| 25 | -CH(C₂H₅)-CH₂ | -C₂H₅ | -C₂H₅ | A | 63 | 175–180°/0.05 mm. Hg | |

TABLE II—Continued

| Example No. | A | R | R' | Method | Yield, percent | Boiling point of the amine | Melting point of the hydrochloride, degrees |
|---|---|---|---|---|---|---|---|
| 26 | $-(CH_2)_3-$ | $-CH_3$ | $-CH_3$ | B | 63 | 182–182.5°/0.05 mm. Hg | 150 |
| 27 | $-(CH_2)_3-$ | $-C_3H_7n$ | $-C_3H_7n$ | C | 51 | 200°/0.07 mm. Hg | |
| 28 | $-CH-CH_2-CH_2-$<br>$\quad\;\;\mid$<br>$\quad\;\;CH_3$ | $-C_2H_5$ | $-C_2H_5$ | A | 37 | 162°/0.04 mm. Hg | |

Of source each of the products identified in Tables I and II can be prepared by any of the methods A to D.

The new compounds were subjected to a series of pharmacological examinations. They were for the most part tested in the form of the base dissolved in aqueous citric acid immediately before use. The doses mentioned are expressed as the base.

The pharmacological techniques are presented below as applied to the product of Example 1.

Acute toxicity

The experiments were carried out on male mice of Swiss strain, of weight varying from 18 to 20 g. The 50% lethal doses were calculated by the method of Miller and Tainter (Proc. Soc. Exp. Biol. Med., 1944, 57, 261).

The following results were found for the compound of Example 1:

$LD_{50}$, administered intravenously: $48\pm2$ mg./kg.
$LD_{50}$, administered intraperitoneally: about 125 mg./kg.
$LD_{50}$, administered orally: $400\pm20$ mg./kg.

Anti-fibrillating activity (a) *Stimulation of the isolated rabbit auricle.*—The method of Dawes, as modified by Alles and Ellis (Ann. N.Y. Acad. Sciences, 1956, 64, 552), was used This technique makes it possible to study the effect of a compound during the refractory period of the heart. An isolated rabbit auricle, dipped into Ringer-Loubatieres liquid, is electrically stimulated at increasing frequency until a phenomenon of "missing-out" (2:1 rhythm in place of 1:1 rhythm) is observed. In the presence of an anti-fibrillating agent the desynchronisation appears at a lower frequency (extension of the refractory period). The reference substances are procainamide and quinidine. The results are expressed as a percentage reduction of the maximum "missing-out" frequency.

Citrate of β-diethylaminoethyl 4-benzylpiperidine-1-carboxylate:

1 µg./ml. of bath—10%
  2 µg./ml. of bath—21%
  5 µg./ml. of bath—28%

Procainamide:

10 µg./ml. of bath—6%
  20 µg./ml. of bath—10%

Quinidine:

5 µg./ml. of bath—16%
  10 µg./ml. of bath—24%

(b) *Intravenous injection of ouabaine into dogs.*—A technique based on that of Arnaud et al. (C.R. Soc. Biol. 1965, 159, 2427) was used. A male or female adult mongrel dog is given an intraperitoneal anaesthetising injection of 15 mg./kg. of pentobarbital and an intravenous injection of atropine (1 mg./kg.). An initial dose of 40 µg./kg. of ouabaine is then injected into the dog by the same route, followed 30 minutes later by a dose of 10 µg./kg. of the same product followed every 10 minutes by fresh administrations of ouabaine at a dose of 10 µg./kg. until cardiac disturbances are set up which are examined by an electrocardiogram (derivations D II and D III) asd which comprises extrasystoles, ventricular tachycardia, and rhythm desynchronisation. The intravenous injection of an anti-fibrillating product re-establishes a rhythm and an almost normal electrocardiograph. The reference products are again procainamide and quinidine.

The compound of Example 1 as the citrate and at an intravenous dose of 5 mg./kg. ($\frac{1}{10}$ of the $LD_{50}$) after 5 seconds causes the re-establishment of an absolutely normal electrocardiograph for 20 minutes. After the 20th minute a few infrequent extrasystoles reappear in groups (salvos) but the graph remains stabilised for at least 90 minutes.

Procainamide at an intravenous dose of 10 mg./kg. ($\frac{1}{10}$ of the $LD_{50}$) causes a slight and transient improvement in the rhythm and in the electrocardiograph, with disturbances re-occurring within 5 minutes following the injection.

Quinidine at an intravenous dose of 7 mg./kg. ($\frac{1}{10}$ of the $LD_{50}$) renders the rhythm regular after 4 minutes, with the electrocardiograph anomalies being preserved and with arhythmia returning 20 minutes after the injection.

(c) *Ligature of the coronary artery in dogs.*—The experiments were carried out by the method of Harris et al. (Circulation Res. 1950, 1, 13; 1951, 4, 522). A male or female adult mongrel dog weighing between 10 and 15 kg. is anaesthetised with pentobarbital (15 mg./kg., administered intraperitoneally) and subjected to artifiical respiration. The dog is placed in the lateral decubitus position and its thorax is opened at the level of the 4th left intercostal space. A pericardial bed is introduced, the descending branch of the left coronary artery is detached between the 2 first collaterals visible after the auricle, and constriction thereof is caused by ligature around a $\frac{7}{10}$ mm. mandrel which is introduced against the artery and then withdrawn. After 30 minutes, total constriction of the artery is brought about by a second ligature. The thorax of the animal is then again closed and the dog is re-animated. After 24 hours, a ventrical arhythm which is compatible with survival of the animal manifests itself. The animal is then treated with the anti-fibrillating product being studied and its electrocardiogram is followed (derivations D II and D III). The salvos of ventricular extrasystoles are counted during reference periods of 10 minutes. The citrate of the compound of Example 1 is compared with the procainamide and quinidine.

The citrate, administered intravenously at a dose of 5 mg./kg., causes a clear reduction in the number of extrasystoles, during the 10 minutes following its injection, relative to the average observed over the course of several 10 minute periods preceding its administration.

Procainamide at an intravenous dose of 10 mg./kg. only causes a very slight diminution in the number of extrasystoles, whilst quinidine at an intravenous dose of 7 mg./kg. allows a more marked effect to be observed during the first 10 minutes.

In conclusion, this series of experiments establishes that the new basic ester has a greater anti-arhythmic activity than either procainamide or quinidine.

Effect on blood pressure

This effect was investigated on anaesthetised rats and dogs. After liberating the carotid, a cannula is introduced into it and the pressure is recorded by a Condon monometer (Brit. J. Pharmacol, 1951, 6, 19). The effect of the compound under test on the initial pressure and on the response to various stimuli is studied.

In rats, at an intravenous dose of 2 to 5 mg./kg., the citrate of the compound of Example 1 causes a brief and slight hypotension without modifying the reactions to adrenalin, to nicotine and to stimulations of the central and peripheral nerve X.

In dogs, at an intravenous dose of 5 mg./kg., the compound produces a moderate hypotension which is relatively prolonged. The effect of acetylcholine appears to be slightly increased but those of adrenalin and histamine remain unchanged.

Spasmolytic activity in vitro

The standard Magnus technique was used (Pflüger's Arch. 1904, 102, 123). A value of about 30 μg./ml. is found for the 50% effective spasmolytic dose on the isolated guinea pig ileum stimulated by histamine [Promethazine is effective at a concentration of 0.05 μg./ml.]. In the case of the isolated duodenum of a rat, contracted by the action of $BaCl_2$, this $ED_{50}$ is 10 μg./ml. [Papaverine is equally effective at a concentration of 5 μg./ml.].

Local anaesthetic effect

The disappearance of the oculo-palpebral reflex caused by a fine hair was investigated in rabbits by the method of Régnier (C.R. Acad. Sciences 1923, 558) after instilling a solution of a local anaesthetic (evaluation of the surface anaesthetic effect). The compounds are tested as a 1% solution in water and are administered in a volume of 1/20 ml. The citrate of the compound of Example 1 has an activity which is about half that of cocaine hydrochloride.

The depth local anaesthetic effect was observed by the technique of Moukhtar, modified by Bulbring and Wajda (J. Pharmacol. 1945, 85, 78). The disappearance of the skin reflex following stimulation of the dorsal skin of the guinea pig (vaccinostyle) is investigated after intradermic injection of the anaesthetic solution (0.5% strength solution, 0.2 ml. volume). The new compound exerts an effect which is close to that of procaine hydrochloride.

The compounds of Examples 2 to 28 were subjected to a series of pharmacological examinations in accordance with the techniques set out above. The products of Examples 2 and 8 were used as the citrates, of Examples 3, 4, 7, 9, 10 and 15 as the hydrochloride, and of Examples 5, 6, 11–14 and 16–28 as the bases dissolved in aqueous citric acid solution. In this last case the doses employed are expressed as the base.

Acute toxicity

The results are shown in Table III.

TABLE III

| Product of Example No. | $LD_{50}$, mg./kg. Administered orally | Administered intravenously | Administered intraperitoneally |
|---|---|---|---|
| 2 | 350 | 55 | |
| 3 | 180 | 23 | |
| 4 | | 43 | |
| 5 | 460 | 32 | |
| 6 | 450 | 20 | |
| 7 | | 44 | |
| 8 | | 80 | |
| 9 | | 80 | |
| 10 | | 33 | |
| 11 | | 32 | |
| 12 | | 28 | |
| 13 | | 25 | |
| 14 | | 22 | |
| 15 | 170 | 24 | |
| 16 | | 21±1 | |
| 17 | | 25±1 | |
| 18 | | 22±1 | 310 |
| 19 | | 35±2 | 75 |
| 20 | | Insoluble | 600 |
| 21 | | 34±3.5 | 180 |
| 22 | | 19±1 | 75 |
| 23 | | 22.5±2.5 | 90 |
| 24 | | 37±2 | 150 |
| 25 | | 22±2 | 150 |
| 26 | | 55±2 | 150 |
| 27 | | 12±0.6 | 75 |
| 28 | | 23±1.5 | |

Anti-fibrillating effect (a) Stimulation of the isolated auricle of the rabbit. The results are collected in Table IV.

TABLE IV

| Product of Example No. | Dose in μg./ml. of bath | Percent reduction in the maximum "missing-out" frequency | Notes |
|---|---|---|---|
| 2 | 2.5 | −15 | |
|   | 5 | −29 | |
| 3 | 0.5 | −21 | |
| 4 | 5 | −26 | |
|   | 1 | −16 | |
| 5 | 2.5 | −28 | |
| 6 | 1 | −28 | The product becomes bonded to the auricle. |
| 7 | 2.5 | −19 | |
|   | 5 | −36 | |
| 8 | 5 | −16 | |
|   | 10 | −25 | |
| 9 | 2.5 | −8 | |
|   | 5 | −27 | |
| 10 | 2.5 | −20 | |
|    | 5 | −44 | |
| 11 | 10 | −7 | |
| 12 | 0.25 | −12 | |
|    | 0.5 | −22 | |
| 13 | 1 | −12 | Do. |
| 14 | 0.5 | −8 | |
|    | 1 | −17 | |
|    | 2.5 | −37 | |
| 15 | 0.5 | −12 | |
|    | 1 | −15 | |
|    | 2.5 | −27 | |
| 16 | 0.5 | −18 | |
|    | 1 | −29 | |
| 17 | 0.5 | −6 | |
|    | 1 | −7.5 | |
| 18 | 1 | −27 | Do. |
|    | 2.5 | −23 | |
| 19 | 3 | −22 | |
|    | 5 | −32 | |
| 20 | The solubility is inadequate for this test to be carried out | | |
| 21 | 1 | −19 | The product is still bonded to the auricle 2 hours after the experiment. |
| 22 | 0.5 | −14 | |
|    | 1 | −28 | |
| 23 | 1 | −25 | Toxic dose. |
|    | 2.5 | | |
| 24 | 5 | −7 | Toxic effect on the auricle. |
| 25 | 0.5 | −16 | |
| 26 | 1 | −7 | |
|    | 5 | −29 | |
| 27 | 1 | −20 | Toxic dose. |
|    | 2.5 | | |
| 28 | 1 | −4 | |
|    | 2.5 | 0 | |

(b) Intravenous injection of ouabaine into dogs. The results, collected in Table V, are expressed in the following manner:

++++ total and definitive protection from the first injection onwards.

+++ total and definitive protection after a few injections.

++ partial protection.

+ regularisation of the rhythm without normalisation of the complexes.

TABLE V

| Product of Example No. | Dose, mg./kg.[1] | Protection | Notes |
|---|---|---|---|
| 2 | 5.5 | ++++ | |
| 3 | 2.3 | +++ | |
| 4 | 4.5 | +++ | |
| 5 | 3.2 | ++ | |
| 6 | 2 | ++ | |
| 10 | 3.3 | + | |
| 15 | 2.4 | +++ | |
| 22 | 2 | ++++ | 1/10 of the $LD_{50}$. 15 minutes after a single injection the trace is normal and the protection lasts at least 90 minutes. |
| 27 | 1.2 | ++++ | 1/10 of the $LD_{50}$. 10 minutes after a single injection the trace becomes normal. Protection more than 2 hours. |

[1] Administered intravenously by injection.

(c) Ligature of the coronary artery in dogs. The administrations of the product are repeated every 1½ hours. The results are collected in Table VI.

TABLE VI

| Product of Example No. | Dose administered, mg./kg. | Method of administration | Results |
|---|---|---|---|
| 2 | 100 / 100 | Oral / do | Almost total protection for 21 hours after the 2d ingestion. / Different animal. 70% protection after the 3rd ingestion. |
| 3 | 50 | Oral | Total protection for a period of 24 hours after the 3rd ingestion. After 48 hours the arhythms reappear and a 4th dose causes a definitive protection. |
| 4 | 4.3 | I.v | Marked antiarhythmic effect without complete disappearance of the disturbances. |
| 5 | 130 | Oral | Approximately 50% protection after 2d ingestion. |
| 6 | 130 | do | Marked effect on the 3rd ingestion. Protection of the order of 40 to 80%. |
| 15 | 50 | do | Partial protection at the 2d ingestion (with convulsions). |
| 22 | 150 | do | Total protection in 15 minutes lasting for at least 6 hours. |
| 27 | 200 | do | Partial protection after the 1st administration, becoming complete at the 2d administration. Duration more than 7 hours. |

(d) Auricular arhythm induced in rats by aconitine. A modification of the method of Scherf (Proc. Soc. Exp. Biol. Med. 1947, 64, 233) was used. Adult rats of the Wistar strain and weighing between 150 and 200 g. are anaesthetised by injection of 1 g./kg. of ethyl carbamate and placed under artificial respiration. A cannula intended for the administration of anti-arhythmic products is introduced into the femoral vein. The electrocardiogram is recorded on derivations D II and D III. A catheter is introduced into the right jugular vein of the rat so as to reach the auricle. The products to be tested are administered into the femoral vein in a volume of 0.2 ml. per 100 g. of animal weight. One minute later 7.5 μg. of aconitine nitrate in a volume of 0.1 ml. are injected through the jugular catheter. In the absence of an anti-arhythmic effect the disturbances which are characteristic of auricle fibrillation manifest themselves in 3 minutes following the injection and have an average duration of 30 minutes. If on the other hand the product being tested is active, a more or less extended protection against these disturbances is observed.

A scale with the following ratings was used.

Duration of protection: Rating
    Less than 5 minutes ------------------------- 0
    5 to 9 minutes ------------------------------ 1
    10 to 14 minutes ---------------------------- 2
    15 to 29 minutes ---------------------------- 3
    Greater than 30 minutes --------------------- 4

Since the experiments were carried out on batches of 5 rats, a rating of 20 is obtained with total protection. The results are collected in Table VII.

TABLE VII

| Product of Example No. | Dose, mg./kg.[1] | Total rating | Notes |
|---|---|---|---|
| 2 | 27 / 14 | 16 / 14 | ½ of the LD$_{50}$. / ⅓ of the LD$_{50}$. |
| 3 | 12 / 8 | 16 / 7 | ½ of the LD$_{50}$. / ¼ of the LD$_{50}$. |
| 4 | 22 | 2 | ½ of the LD$_{50}$. |
| 5 | 16 | 5 | Do. |
| 6 | 10 | 4 | Do. |
| 7 | 22 | 1 | Do. |
| 8 | 40 | 5 | Do. |
| 9 | 40 | 0 | Do. |
| 10 | 16 | 1 | Do. |
| 11 | 16 | 3 | Do. |
| 12 | 14 | 0 | Do. |
| 13 | 12 | 0 | Do. |
| 14 | 11 | 5 | Do. |
| 15 | 12 | 0 | Do. |
| 16 | 4 / 7 | 2 / 3 | ⅙ of the LD$_{50}$. / ⅓ of the LD$_{50}$. |
| 17 | 12 | 2 | ½ of the LD$_{50}$. |
| 18 | 11 | 0 | Do. |
| 19 | 17.5 | 2 | Do. |
| 20 | | | Insoluble compound |
| 21 | 17 | 0 | ½ of the LD$_{50}$; the animal dies a few minutes after the injection if it is not under artificial respiration. |
| 22 | 4.5 / 6 | 0 / 20 | ¼ of the LD$_{50}$. / ⅓ of the LD$_{50}$. |
| 23 | 4 / 7 / 11 | 17 / (2) / (2) | ⅙ of the LD$_{50}$. / ⅓ of the LD$_{50}$. / ½ of the LD$_{50}$. |
| 24 | 17 | | ½ of the LD$_{50}$; the animals die a few minutes after injection of the product. |
| 25 | 10 | 1 | ½ of the LD$_{50}$. |
| 26 | 28 | 0 | Do. |
| 27 | 6 | 16 | Do. |
| 28 | 7.5 | 16 | Do. |

[1] Administered intravenously.  [2] Toxic effect.

Effect on blood pressure

Experiments were carried out with rats using the technique described above. All the products of Examples 2 to 15 produce slight hypotensive effects at doses of 1.2 and 5 mg./kg. An increase in the effects of adrenalin is generally observed, but the effects of acetylcholine are unaltered.

The majority of the products of Examples 16 to 28 administered intravenously at doses of 1 to 5 mg./kg. are transient hypotensive agents of average intensity which do not cause changes in the effects of adrenalin and acetylcholine. The following exceptions were however observed. The product of Example 19 has a more prolonged hypotensive effect at an intravenous dose of 5 mg./kg. with an increase in the effects of adrenalin and a reduction in those of acetylcholine. The product of Example 22 has a moderate hypotensive effect with a slight adrenolytic effect. The product of Example 27 has a slight hypotensive effect with an increase in the action of adrenalin at an intravenous dose of 5 mg./kg.

Spasmolytic activity in vitro

The standard method of Magnus was used. All the products show a musculotropic spasmolytic effect ranging from half to six times that of papaverine. The most active compounds amongst those of Examples 2 to 15 are, in order of decreasing activity, those of Examples 14, 15, 12 and 2.

The products of Examples 16 to 28 in turn generally show a strong spasmolytic musculotropic activity comparable with that of papaverine. The results are shown in Table VIII.

TABLE VIII

| | Micrograms per liter of bath | |
|---|---|---|
| | ED$_{50}$ | ED$_{50}$ of papaverine |
| Product of Example No.: | | |
| 16 | 2.5 | 5 |
| 17 | 1 | 5 |
| 18 | 10 | 10 |
| 19 | 5 | 7.5 |
| 20 | Insoluble | |
| 21 | 1.5 | 5 |
| 22 | 7.5 | 15 |
| 23 | 3.5 | 10 |
| 24 | 7.5 | 10 |
| 25 | 5 | 15 |
| 26 | 7.5 | 15 |
| 27 | 2 | 20 |
| 28 | 2.5 | 5 |

Analgesic effect

The method Siegmund (Proc. Soc. Exp. Biol. Med. 1957 95, 729) was used. The intraperitoneal injection of 2-phenyl-1,4-benzoquinone causes a particular syndrome in mice which is characterised by intermittent contractions of the abdomen, a twisting of the trunk and an extension of the rear paws. Narcotic and non-narcotic analgesics are antagonistic to this syndrome. The percentage of protection 20 minutes after oral administration of the products is investigated, with acetylsalicylic acid serving as a reference compound.

All the compounds of the invention show a slight analgesic effect which, in the majority of cases, is less than that shown by the same dose of acetylsalicylic acid. The most active products are those of Examples 12 and 7. They respectively give 66 and 58% protection, while in the same dosage, acetylsalicylic acid only gives protection of 46%.

The new esters of the Formula I and their pharmaceutically acceptable acid addition salts may be used as medicines in the clinical treatment of human beings, in disturbances of the cardiac rhythm and in particular in palpitations, auricular and ventricular extrasystoles, fibrillation and flutter, auricular tachysystoles, paroxystic tachycardia, rhythm disturbances following treatment by digitalis-type materials and rhythm disturbances observed in cases of myocardial infarction. They can be administered parenterally, orally or rectally.

The invention accordingly includes within its scope pharmaceutical compositions comprising in association with a pharmaceutically acceptable carrier or coating, a 4-benzyl-1-piperidine carboxylic acid ester of Formula I or a pharmaceutically acceptable acid addition salt thereof.

The following examples illustrate such pharmaceutical compositions.

Injectable solution for subcutaneous, intramuscular or intravenous injection Citrate of the compound of Example 1 or of that of Example 22: 0.020 g.
Sterile isotonic saline, q.s. for an ampoule of 1 ml.
or
Citrate of the compound of Example 2: 0.010 g.
Sterile isotonic saline, q.s. for an ampoule of 1 ml.

The ampoules can also be of 2 or 5 ml. and the amount of active principle can vary from 0.01 to 0.1 g./ml.

Tablets

| | G. |
|---|---|
| Citrate of the compound of Example 1 or hydrochloride of the compound of Example 3 | 0.05 |
| Rice starch | 0.07 |
| Talc | 0.10 |
| Magnesium stearate | 0.003 |

These tablets may be coated or turned into dragees. The content of active principle may range from 0.02 to 0.10 g. per tablet for the compound of Example 1, or from 0.02 to 0.15 g. for that of Example 3, and any of the usual excipients for this pharmaceutical form may be used.

Further example of tablets

| | G. |
|---|---|
| Hydrochloride of the compound of Example 22 | 0.075 |
| Rice starch | 0.07 |
| Talc | 0.10 |
| Magnesium stearate | 0.003 |

These tablets may be coated or turned into dragees. The content of active principle may be between 0.02 and 0.25 g. per tablet and any of the excipients which are usual for this pharmaceutical form may be used.

Suppositories

Citrate of the compound of Example 1 or of that of Example 5 or hydrochloride of the compound of Example 22: 0.05 g.
Imhausen excipient, q.s.p.: 1 suppository The dose of active principle may be up to 0.25 g. for the compound of Example 1, 0.30 g. for that of Example 5 and 0.50 g. for that of Example 22. The other usual excipients such as cacao butter may be used.

The new compounds may be administered at average daily doses of 100 to 500 mg. orally or rectally or 50 to 200 mg. parenterally.

The various basic esters and their salts may of course be present in the pharmaceutical compositions either alone or combined with one another, or with other active principles.

We claim:
1. A 4-benzylpiperidine-1-carboxylic acid ester of the formula:

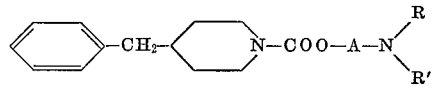

and its pharmaceutically acceptable acid addition salts, in which A is a straight or branched alkylene chain of 2 to 8 carbon atoms, R is alkyl of 1 to 4 carbon atoms, R' is alkyl of 1 to 4 carbon atoms or phenylalkyl in which the alkyl residue is of 1 to 4 carbon atoms, or R and R' together with the adjacent nitrogen make up a pyrrolidino, piperidino or morpholino group.

2. A 4-benzylpiperidine-1-carboxylic ester according to claim 1 and its pharmaceutically acceptable acid addition salts, wherein said ester is the 2-diethylaminoethyl ester of said 4-benzylpiperidine-1-carboxylic acid.

3. A 4-benzylpiperidine-1-carboxylic ester according to claim 1 and its pharmaceutically acceptable acid addition salts, wherein said ester is the 2-diethylamino-1-methylethyl ester of said 4-benzylpiperidine-1-carboxylic acid.

4. A 4-benzylpiperidine-1-carboxylic ester according to to claim 1 and its pharmaceutically acceptable acid addition salts, wherein said ester is the 2-diisopropylaminoethyl ester of said 4-benzylpiperidine-1-carboxylic acid.

5. A 4-benzylpiperidine-1-carboxylic ester according to claim 1 and its pharmaceutically acceptable acid addition salts, wherein said ester is the 2-dimethylamino-1-methyl-ethyl ester of said 4-benzylpiperidine-1-carboxylic acid.

6. A 4-benzylpiperidine-1-carboxylic ester according to claim 1 and its pharmaceutically acceptable acid addition salts, wherein said ester is the 1-diethylaminomethyl-n-butyl ester of said 4-benzylpiperidine-1-carboxylic acid.

7. A 4-benzylpiperidine-1-carboxylic ester according to claim 1 and its pharmaceutically acceptable acid addition salts, wherein said ester is the 2-(di-n-butylamino)ethyl ester of said 4-benzylpiperidine-1-carboxylic acid.

8. A 4-benzylpiperidine-1-carboxylic ester according to claim 1 and its pharmaceutically acceptable acid addition salts wherein said ester is the 2-piperidino(1)ethyl ester of said 4-benzylpiperidine-1-carboxylic acid.

9. A 4-benzylpiperidine-1-carboxylic ester according to claim 1 and its pharmaceutically acceptable acid addition salts, wherein said ester is the 2-dimethylaminoethyl ester of said 4-benzylpiperidine-1-carboxylic acid.

10. A 4-benzylpiperidine-1-carboxylic ester according to claim 1 and its pharmaceutically acceptable acid addition salts, wherein said ester is the 2-morpholino(4)ethyl ester of said 4-benzylpiperidine-1-carboxylic acid.

11. A 4-benzylpiperidine-1-carboxylic ester according to claim 1 and its pharmaceutically acceptable acid addition salts, wherein said ester is the 2-diethylamino-1,1-dimethylethyl ester of said 4-benzlypiperidine-1-carboxylic acid.

12. A 4-benzylpiperidine-1-carboxylic ester according to claim 1 and its pharmaceutically acceptable acid addition salts, wherein said ester is the 5-amino-1,1,5-trimethylpentyl ester of said 4-benzylpiperidine-1-carboxylic acid.

13. A 4-benzylpiperidine-1-carboxylic ester according to claim 1 and its pharmaceutically acceptable acid addition salts, wherein said ester is the 2-(N-methyl-N-phenethylamino)ethyl ester of said 4-benzylpiperidine-1-carboxylic acid.

14. A 4-benzylpiperidine-1-carboxylic ester according to claim 1 and its pharmaceutically acceptable acid addition salts, wherein said ester is the 2-(N-phenethyl-N-methylamino)-1-methyl-ethyl ester of said 4-benzylpiperidine-1-carboxylic acid.

15. A 4-benzlypiperidine-1-carboxylic ester according to claim 1 and its pharmaceutically acceptable acid addition salts, wherein said ester is the 2-(N-isopropyl-N-methylamino)-1-methyl-ethyl ester of said 4-benzylpiperidine-1-carboxylic acid.

16. A 4-benzylpiperidine-1-carboxylic ester according to claim 1 and its pharmaceutically acceptable acid addition salts, wherein said ester is the 3-diethylaminopropyl ester of said 4-benzylpiperidine-1-carboxylic acid.

17. A 4-benzylpiperidine-1-carboxylic ester according to claim 1 and its pharmaceutically acceptable acid addition salts, wherein said ester is the 2-(N,N-di-n-propylamino)ethyl ester of said 4-benzylpiperidine-1-carboxylic acid.

18. A 4-benzylpiperidine-1-carboxylic ester according to claim 1 and its pharmaceutically acceptable acid addition salts, wherein said ester is the 2-(N-methyl-n-benzylamino)ethyl ester of said 4-benzylpiperidine-1- carboxylic acid.

19. A 4-benzylpiperidine-1-carboxylic ester according to claim 1 and its pharmaceutically acceptable acid addition salts, wherein said ester is the 2-(N-ethyl-N-phenethylamino)ethyl ester of said 4-benzylpiperidine -1-carboxylic acid.

20. A 4-benzylpiperidine-1-carboxylic ester according to claim 1 and its pharmaceutically acceptable acid addition salts, wherein said ester is the 2-(N-n-propyl-N-phenethylamino)ethyl ester of said 4-benzylpiperidine-1-carboxylic acid.

21. A 4-benzylpiperidine-1-carboxylic ester according to claim 1 and its pharmaceutically acceptable acid addition salts, wherein said ester is the 2-(N-methyl-N-phenylpropylamino)ethyl ester of said 4-benzylpiperidine-1-carboxylic acid.

22. A 4-benzylpiperidine-1-carboxylic ester according to claim 1 and its pharmaceutically acceptable acid addition salts wherein said ester is the 1-(N,N-di-n-propylamino)propyl-(2) ester of said 4-benzylpiperidine-1-carboxylic acid.

23. A 4-benzylpiperidine-1-carboxylic ester according to claim 1 and its pharmaceutically acceptable acid addition salts, wherein said ester is the 1-(N,N-dipropylamno)propyl-(2) ester of said 4-benzylpiperidine-1-carboxylic acid.

24. A 4-benzylpiperidine-1-carboxylic ester according to claim 1 and its pharmaceutically acceptable acid addition salts, wherein said ester is the 1-(N,N-di-n-butylamino)propyl-(2) ester of said 4-benzylpiperidine-1-carboxylic acid.

25. A 4-benzylpiperidine-1-carboxylic ester according to claim 1 and its pharmaceutically acceptable acid addition salts, wherein said ester is the 1-(N-methyl-N-benzylamino)propyl-(2) ester of said 4-benzylpiperidine -1-carboxylic acid.

26. A 4-benzylpiperidine-1-carboxylic ester according to claim 1 and its pharmaceutically acceptable acid addition salts, wherein said ester is the 1-(N,N-diethylamino)butyl-(2) ester of said 4-benzylpiperidine-1-carboxylic acid.

27. A 4-benzylpiperidine-1-carboxylic ester according to claim 1 and its pharmaceutically acceptable acid addition salts, wherein said ester is the 1-(N,N-dimethylamino)propyl-(3) ester of said 4-benzylpiperidine-1-carboxylic acid.

28. A 4-benzylpiperidine-1-carboxylic ester according to claim 1 and its pharmaceutically acceptable acid addition salts, wherein said ester is the 1-(N,N-di-n-propylamino)propyl-(3) ester of said 4-benzylpiperidine-1-carboxylic acid.

29. A 4-benzylpiperidine-1-carboxylic ester according to claim 1 and its pharmaceutically acceptable acid addition salts, wherein said ester is the 1-(N,N-diethylamino)butyl-(3) ester of said 4-benzylpiperidine-1-carboxylic acid.

30. 2-(N,N-diethylamino)ethyl 4 - benzylpiperidine-1-carboxylate and its pharmaceutically acceptable acid addition salts.

31. 1-(N,N-diethylamino)-2-propyl 4-benzylpiperidine-1-carboxylate and its pharmaceutically acceptable acid addition salts.

32. 1-(N,N-diisopropylamino)-2-propyl 4-benzylpiperidine-1-carboxylate and its pharmaceutically acceptable acid addition salts.

33. 2-(N,N-diisopropylamino)ethyl 4-benzylpiperidine-1-carboxylate.

34. 1-(N,N-diethylamino)-2-pentyl 4-benzylpiperidine-1-carboxylate.

References Cited
UNITED STATES PATENTS

| | | | |
|---|---|---|---|
| 2,033,740 | 3/1936 | Rider | 260—43 |
| 2,794,810 | 6/1957 | Cusic | 260—326.3 |

OTHER REFERENCES

Rost, J. Am. Pharm. Assoc. 46, 290–2 (1957).

HENRY R. JILES, Primary Examiner

G. T. TODD, Assistant Examiner

U.S. Cl. X.R.

260—294.3, 294.7; 424—248, 267